Aug. 20, 1957 — R. D. EHRET — 2,803,490
FUNERAL CAR AND AMBULANCE
Filed Sept. 11, 1953

INVENTOR
ROBERT D. EHRET
By Toulmin & Toulmin
Attorneys

2,803,490
FUNERAL CAR AND AMBULANCE

Robert D. Ehret, Hato Rey, Puerto Rico

Application September 11, 1953, Serial No. 379,598

4 Claims. (Cl. 296—16)

This invention relates to a funeral car and ambulance, and particularly to a construction of such a vehicle enabling it readily to be converted from one type of service to the other.

The vehicle of the present invention is primarily designed for use as a funeral car and consists basically of a vehicle of modern style having a casket compartment at the floor level in back, and being provided with a deck above the casket for receiving flowers. The vehicle is, thus, a combined hearse and flower car and offers the distinct advantage of ultra-modern appearance, as well as the convenience associated with carrying flowers in the same vehicle with the casket, rather than being required to provide a separate flower car.

While a vehicle of the type referred to has met with ready acceptance in the field, it still presents uneconomical features in that many morticians desire to have an ambulance available at all times. The funeral car as described above is not adapted for ambulance service because of the flower deck therein, and it is in particular connection with an arrangement for converting such a vehicle to ambulance use that this invention is concerned.

Having the foregoing in mind, the primary object of this invention is the provision of a funeral car that can be converted to multiple uses simply and quickly.

A still further object of this invention is the provision of a funeral car of the nature referred to that can readily be converted for use as an ambulance.

Another object is the provision of a funeral car having a flower deck extending therealong in which the flower deck can be moved from its normal position, thereby exposing the interior of the vehicle for use as an ambulance compartment.

Another particular object is the provision of an arrangement whereby the flower deck in a funeral car of the nature referred to can be moved from its normal position to expose the interior of the vehicle for use as an ambulance compartment with the flower deck then being positioned inside the windows of the vehicle to give it the appearance of an ambulance.

A still further object is the provision of an arrangement referred to which does not involve great expense in constructing the vehicle.

A still further particular object of this invention is the provision of a novel vehicle design especially adapted for use as a funeral car, flower car, or ambulance, and characterized by elongated windows at the sides of the rear compartment of the vehicle.

These and other objects and advantages will become more apparent upon reference to the following description taken in connection with the accompanying drawings, in which.

Figure 1:
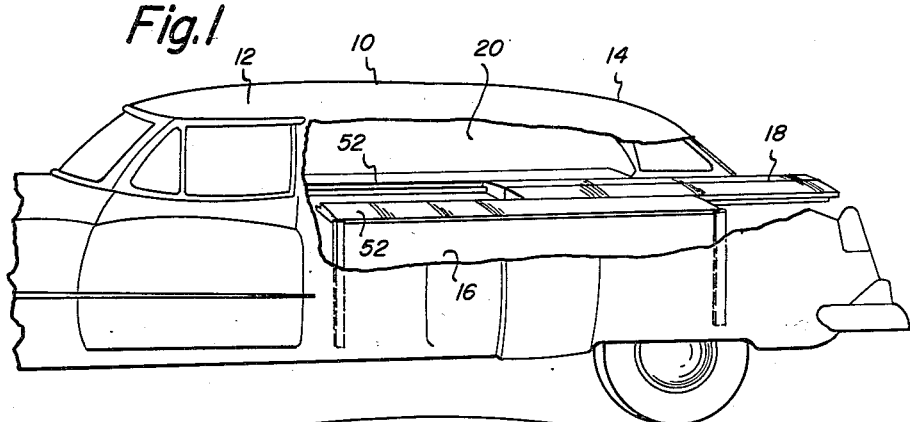
Figure 1 is a side elevational view, partly broken away, of a funeral car according to my invention.
Figure 2:
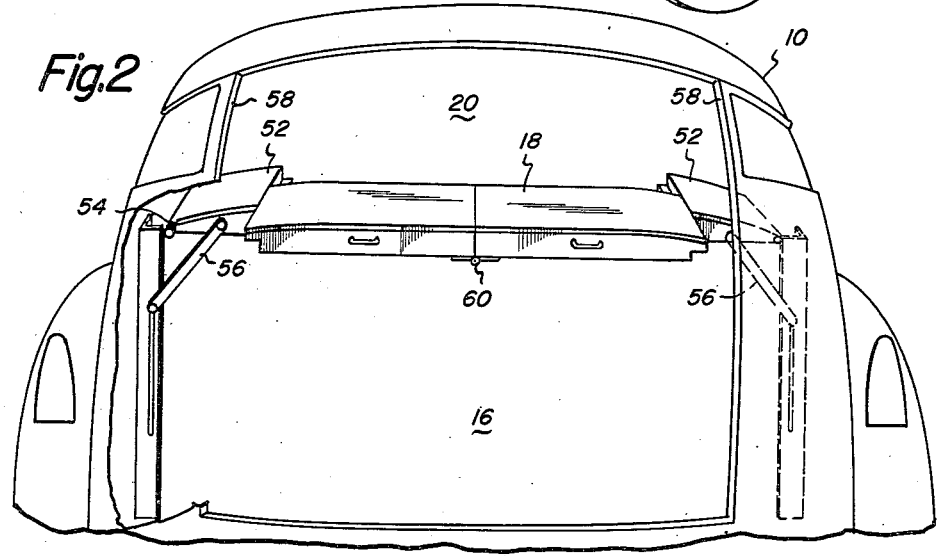
Figure 2 is a rear view with the doors removed therefrom and also partly broken away, showing the arrangement of the flower deck in the vehicle and the manner in which the flower deck can be moved.

Referring to the drawings somewhat more in detail, vehicle 10 in Figure 1 has a driver's compartment 12 and an elongated rear compartment 14, which, as will be seen in Figures 1 and 2, comprises a lower casket compartment 16, which is closed at the top by a flower deck 18, and between which flower deck and the roof of the vehicle there is a flower compartment 20. This arrangement permits carrying of the flowers in the same vehicle with the casket, and, likewise, greatly beautifies the hearse and provides for an extremely modern appearance of the hearse, as well as eliminating the necessity for a separate flower car in many instances.

As has been mentioned previously, however, most morticians desire for their hearses also to be used as ambulances, and to this end I provide means whereby the flower deck 18 can be moved out of its Figure 1 position in a manner as shown in Fig. 2.

Figure 3:
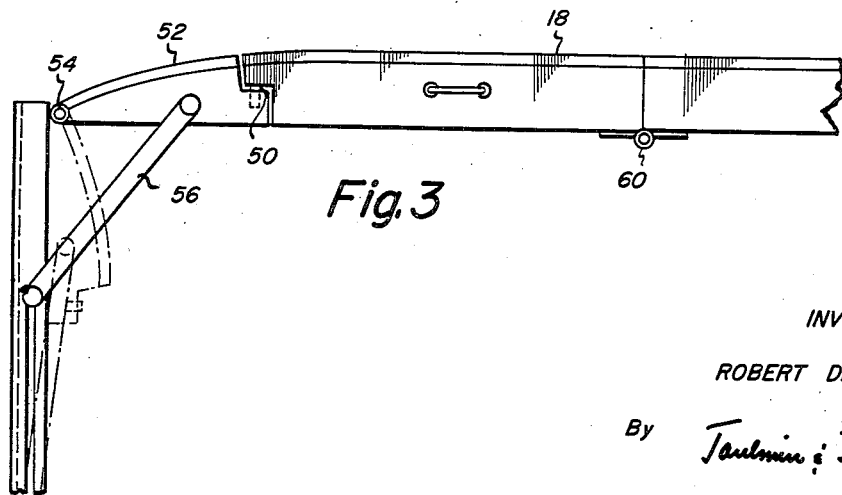
Figure 3 is a rear elevational view in enlarged scale showing the arrangement for supporting the flower deck in the vehicle, as illustrated in Figures 1 and 2.

In Figures 2 and 3 the flower deck 18 is adapted to be slid into the vehicle endwise by engagement at its opposite edge with the roller means 50 carried on the brackets 52 pivoted to the sides of the vehicle at 54, and adapted for being lowered to an out of the way position by release of the supporting arms 56.

In the Figure 3 arrangement, the flower deck 18 is made slightly narrower than the rear door opening 58, so that it can readily be moved through the door for putting it in place or removing it from the vehicle. For a removable deck of the general nature illustrated in Figure 3, it is also possible to hinge the deck in the center, as at 60, so that after it is removed from the vehicle it can be stored in a folded position.

From the foregoing, it will be appreciated that one of the principal characterizing features of the vehicle of the present invention is the long window at the side of the rear compartment. This is distinctly different from conventional funeral car or ambulance construction, and offers distinct advantages over previous vehicle constructions. It will be evident that by utilizing the elongated window, it is possible completely to eliminate the flower tray under certain circumstances, and to cover a casket in the rear compartment with a blanket of flowers or a large flower piece, rather than placing the flowers on top of the flower deck.

It will also be evident that the entire flower deck and the supporting brackets therefor could be detachably mounted within the vehicle so as to be entirely removable therefrom, and that the flower deck and brackets could be sold as an individual item of commerce for being incorporated in a vehicle of the nature disclosed.

It will be understood that this invention is susceptible to modification in order to adapt it to different usages and conditions, and, accordingly, it is desired to comprehend such modifications within this invention as may fall within the scope of the appended claims.

I claim:

1. In a funeral car having an elongated rear compartment with side windows, a deck extending across said compartment in the region of the lower portion of said windows dividing the compartment into a lower casket space and an upper flower space, said car being provided with a rear door opening, bracket means in the car with a portion thereof running the length of the deck and being co-extensive with said deck to form a continuous upper surface therewith, said bracket means having one end extending inwardly to beyond the edge of the door opening in the back of the car whereby the deck can be constructed of a size that would pass through said door opening, said bracket means slidably engaging the said deck whereby said deck can be withdrawn through the rear door of said car and clear the car for ambulance use.

2. In a funeral car having an elongated rear compartment with side windows, said car being provided with a rear door opening less than the width of said compartment, deck means extending substantially across said compartment dividing said compartment into a lower casket space and an upper flower space, bracket means on the sides of said rear compartment, said bracket means including a substantially vertical portion and a substantially horizontal portion at the upper end of said vertical portion having one end extending inwardly beyond the edge of said rear door opening, said horizontal portion being co-extensive with said deck means to form a continuous upper surface therewith, and track means extending the full length of said deck means on the said one end of the horizontal portion of each bracket means to support the edge of said deck means for slidable detachment therefrom.

3. In a funeral car having an elongated rear compartment with side windows, said car being provided with a rear door opening less than the width of said compartment, deck means extending substantially across said compartment dividing said compartment into a lower casket space and an upper flower space, bracket means on the sides of said rear compartment, said bracket means having a substantially vertical portion and a substantially horizontal portion at the upper end of said vertical portion and having one end extending inwardly beyond the edge of said rear door opening, said horizontal portion running the length of said deck and being co-extensive with the upper surface of said deck to the side walls of the car to form a continuous upper surface with said deck, and track means extending the full length of the deck means on said end of the horizontal portion of the bracket means for supporting the edge of said deck means for slidable detachment therefrom.

4. In a funeral car having an elongated rear compartment with side windows, said car being provided with a rear door opening less than the width of said compartment, deck means extending substantially across said compartment dividing said compartment into a lower casket space and an upper flower space, bracket means on the sides of said rear compartment, said bracket means having a horizontal portion with one end extending inwardly beyond the edge of said rear door opening and running substantially the length of said deck means to form continuous upper and lower surfaces with said deck means, said horizontal portion connected by a substantially vertical portion to the wall of said compartment below said horizontal portion, and track means extending the full length of said deck means on the one end of the horizontal portion of each bracket means for slidably engaging the entire length of adjacent edges of said deck means for slidable detachment therefrom.

References Cited in the file of this patent

UNITED STATES PATENTS

| | | |
|---|---|---|
| 1,251,163 | Yeider | Dec. 25, 1917 |
| 1,532,128 | Fletcher | Apr. 7, 1925 |
| 1,801,405 | Wolfe | Apr. 21, 1931 |
| 1,862,286 | Tipton | June 7, 1932 |
| 1,971,991 | Robertson | Aug. 28, 1934 |
| 2,254,193 | Augustine | Aug. 26, 1941 |
| 2,370,402 | Gutman | Feb. 27, 1945 |
| 2,456,024 | Schofield | Dec. 14, 1948 |
| 2,585,046 | Schofield | Feb. 12, 1952 |